Figure 1:
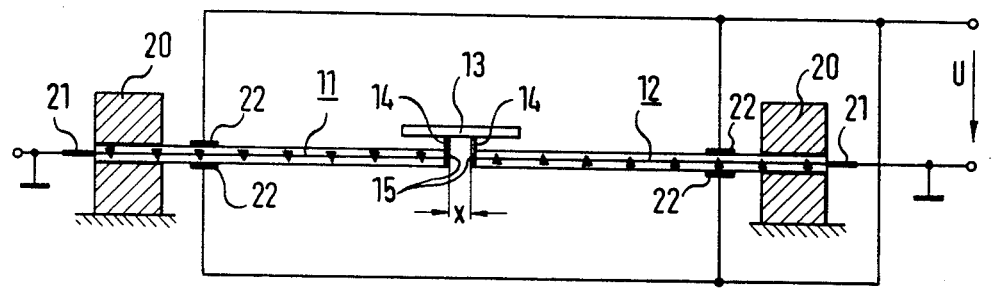

United States Patent [19]

Lauer et al.

[11] 4,436,364

[45] Mar. 13, 1984

[54] PIEZOELECTRIC APPARATUS FOR PRODUCING ROTARY OSCILLATION OF A MIRROR

[75] Inventors: Reinhard Lauer, Denzlingen; Dietmar Pfefferle, Pfaffenweiler, both of Fed. Rep. of Germany

[73] Assignee: Erwin Sick GmbH Optik-Elektronik, Waldkirch, Fed. Rep. of Germany

[21] Appl. No.: 299,366

[22] Filed: Sep. 4, 1981

[30] Foreign Application Priority Data

Sep. 18, 1980 [DE] Fed. Rep. of Germany ....... 3035315

[51] Int. Cl.³ .................... G02B 27/17; G02F 1/34
[52] U.S. Cl. ................................ 350/6.6; 350/487
[58] Field of Search ............... 350/6.6, 6.1, 487; 350/484

[56] References Cited

U.S. PATENT DOCUMENTS

| | | | |
|---|---|---|---|
| 2,010,016 | 8/1935 | French | 350/6.6 |
| 3,442,570 | 5/1969 | Picker | |
| 3,758,199 | 9/1973 | Thaxter | 350/487 |

FOREIGN PATENT DOCUMENTS

| | | |
|---|---|---|
| 2518347 | 11/1975 | Fed. Rep. of Germany |
| 2532925 | 2/1976 | Fed. Rep. of Germany |
| 2950919 | 6/1980 | Fed. Rep. of Germany |
| 1519185 | 7/1978 | United Kingdom |

OTHER PUBLICATIONS

Lee, "Piezoelectric Bimorph Optical Beam Scanners: Analysis and Construction," Applied Physics, vol. 18, No. 4, 2/79, pp. 454–459.

*Primary Examiner*—John K. Corbin
*Assistant Examiner*—Rebecca D. Gass
*Attorney, Agent, or Firm*—Townsend & Townsend

[57] ABSTRACT

Piezoelectric light deflecting apparatus consists of first and second piezoceramic strips 11, 12 each of which has a clamped end and a free end 15. The strips 11, 12 are substantially aligned in one plane with their free ends 15 facing one another and spaced apart by a distance x. An AC voltage U having a frequency which differs significantly from the natural resonant frequency of the strips is used to energize the strips to execute oscillations so that their free ends are periodically displaced in counterphase to one another. A mirror 13 is mounted via flexible legs 14 to the free ends of the piezoceramic strips 11, 12 so that the mirror 13 executes a rotary oscillation as a result of the counterphase movements of the free ends of the piezoceramic strips.

9 Claims, 3 Drawing Figures

PIEZOELECTRIC APPARATUS FOR PRODUCING ROTARY OSCILLATION OF A MIRROR

The invention relates to a piezoelectric light deflecting apparatus having a mirror which can be caused to execute a rotary oscillation by a piezoelectric device energized by an AC voltage.

Piezoelectric light deflecting apparatuses are known (U.S. Pat. Nos. 3,544,202; 3,544,201; 3,508,814, DE-AS Nos. 19 22 423 and DE-AS 23 21 211). The known deflection systems are arranged to operate at resonance. Their practical use is however generally limited because they are very sensitive to vibration and shocks.

The principal object underlying the present invention is thus to provide a piezoelectric light deflecting apparatus of the initially named kind by means of which a mirror of a predetermined size can be operated so that it follows the electrical voltage and executes a rotary oscillation within a specified range.

The mechanical construction should additionally be substantially insensitive to vibrations and shocks.

In order to accomplish this object it is envisaged, in accordance with the invention, that two piezoceramic flexible strips each clamped at one end are arranged in a plane with their ends remote from the ends at which they are clamped lying opposite and spaced apart from each other; that the flexible strips are energized by an AC voltage which differs significantly from the resonant frequency of the flexible strips so that they oscillate in counterphase and that the mirror is arranged parallel to the two flexible strips in the region of their free ends and is connected to the free ends of the flexible strips in each case via a respective resilient member.

Thus the invention is characterized by first and second piezoceramic strips each having a clamped end and a free end, said strips being substantially aligned in one plane with their free ends facing and spaced apart from each other, by AC voltage means having a frequency which differs significantly from a resonant frequency of said strips for energizing said strips to execute oscillations so that said free ends are periodically disposed in counterphase out of said plane and by respective resilient mounting means extending between said free ends and said mirror for mounting said mirror on strips.

The arrangements characterized above are insensitive to vibrations because modes of oscillation excited by vibrations should not in theory, and do not in practice produce any significant rotary oscillatory movement of the mirror.

The construction is preferably such that each resilient member consists of a short, flexible synthetic leg which is fastened to the free end of the associated flexible strip at right angles to the plane of the flexible strip and parallel to the free end faces thereof.

Each synthetic leg is preferably connected to the free end face of the associated flexible strip.

The suppression of natural osciallations is achieved, in accordance with the invention, by connecting both flexible strips to a circuit arrangement which consists of an amplifier part, a charge amplifier and an all-pass filter. A feedback electrode should be provided on at least one of the flexible strips.

Thus, in accordance with the invention, no special movement transducer or pick-up needs to be provided to generate a feedback signal. The arrangement of an electrode which generates a feedback signal on a flexible piezoceramic strip is less complicated and expensive than a movement transducer and leads to a very reliable arrangement.

The deflection of the piezoceramic strip produces a change in the state of charge on the feedback electrode. This is amplified via a charge amplifier. The voltage at the output of the charge amplifier is a representation of the rotary oscillatory movement of the mirror and indeed displaced by a transit time $\tau$. The function of the subsequent all-pass filter is to delay the feedback signal. The delayed feedback signal is added to the input voltage of the function generator which generates an AC voltage. The total delay time should be half the duration of one period of the mechanical natural oscillation. This ensures that a natural oscillation generated for example by a step function is automatically quenched after the time T/2.

As a result of the construction of the invention considerably shorter rise times are possible than with mechanical damping. The sensitivity of the arrangement of the invention to tolerances is sufficiently small for most practical applications.

Although the preferred embodiment of the invention operates using first and second piezoceramic strips it is also possible to use only a single piezoceramic strip and to replace the other piezoceramic strip with an effectively rigid mounting.

Thus, there is also provided, in accordance with the invention, piezoelectric light deflecting apparatus having a mirror which can be caused to execute a rotary oscillation by a piezoelectric device energized by an AC voltage the apparatus being characterized by an elongate piezoceramic strip having a clamped end and a free end, by resilient means connecting said free end to said mirror, by means spaced from said free end for mounting said mirror by for pivotal movement relative to fixed structure and AC voltage means having a frequency which differs significantly from the resonant frequency of the piezoceramic strip for energizing said piezoceramic strip to produce oscillating movement of said free end and thereby rotary oscillation of said mirror.

Figure 2:
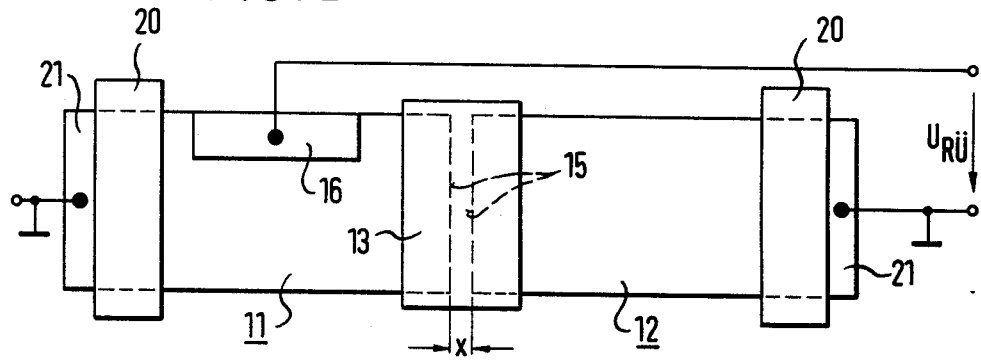
Figure 3:
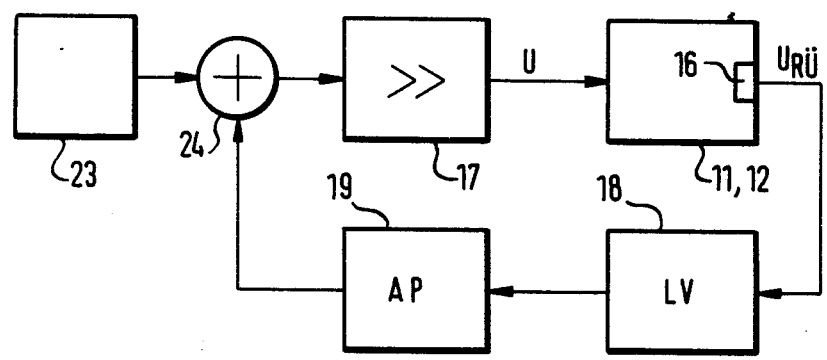

The invention will now be described in further detail by way of example only and with reference to the accompanying drawings which show:

FIG. 1 a schematic side view of a piezoelectric light deflecting apparatus in accordance with the invention, FIG. 2 a plan view of the subject of FIG. 1 and FIG. 3 a preferred circuit arrangement for operating the light deflecting apparatus of FIGS. 1 and 2.

As seen in FIGS. 1 and 2, first and second, piezoceramic flexible strips 11 and 12 are respectively clamped in two spaced apart blocks 20 so that they lie in a plane with their free end faces facing one another and spaced apart by a small distance x. The blocks 20 are fastened to a frame or housing and can be regarded as fixed structure. The first and second flexible strips 11, 12 thus lie opposite one another in a common plane.

As seen in FIG. 2 the two flexible strips are of substantially rectangular shape with the oppositely disposed end faces 15 extending parallel to one another and spaced apart by the distance x. The earth connections 21 for the flexible strips 11, 12 project beyond the surfaces of the blocks 20 which face away from the free end faces 15.

It is important that the two flexible strips 11, 12 are clamped in the blocks 20 and are polarized in opposite directions as is indicated by the oppositely directed arrows of FIG. 1.

Short, flexible, synthetic legs 14 are fastened at right angles to the flexible strips 11 and 12 at the oppositely disposed end faces 15. The flexible synthetic legs 14 carry a mirror 13 which is arranged at a distance above the slot between the two flexible strips 11, 12. The upper ends of the synthetic limbs or webs 14 are fixedly connected with the lower side of the mirror 13 which is arranged symmetrically on the legs 14.

The two flexible strips 11, 12 are excited to execute a counterphase oscillatory movement so that their free ends are periodically displaced in counterphase out of the common plane by means of an AC voltage U which is fed to electrodes 22 arranged on the upper and lower sides of the flexible strips 11, 12. The central layer is earthed via the central electrodes 21 which extend to the end faces 15 and which can be conveniently used to secure the synthetic legs 14. In this latter arrangement the electrodes 21 are extended and are embedded in, or secured by adhesive to the synthetic legs 14.

A feedback electrode 16 is arranged on and to one side of the flexible strip 11 and a feedback voltage $U_{RÜ}$ can be tapped off between the feedback electrode and the electrode 21.

As shown in FIG. 3 an electrical voltage, generated by a function generator 23, is applied via a summing stage 24 and an amplifier part 17 between the electrodes 22 of the flexible strips 11, 12 and earth. The voltage plot can be of saw-tooth-like form. The feedback voltage $U_{RÜ}$ which is tapped from the feedback electrode 16 will contain a mixture of frequencies which will include the mechanical natural frequency of the arrangement. The feedback voltage $U_{RÜ}$ is passed through a charge amplifier 18 to which is connected an allpass filter 19. In the summing stage 24 the delayed feedback signal is added to the output voltage of the function generator.

The manner of operation of the described apparatus is as follows:

By applying the AC voltage U to the flexible strips 11 and 12 these strips are excited to execute a counterphase oscillatory movement which produces a corresponding oscillatory movement of the mirror 13 about an axis at right angles to the plane of FIG. 1.

A deflection of the piezoceramic flexible strip 11 produces a change of the charge on the feedback electrode 16. This is amplified by the charge amplifier 18. The voltage at the output of the charge amplifier 18 is a representation of the rotary oscillation of the mirror 13 and indeed displaced by a transit time $\tau$. The function of the subsequent all-pass filter 19 is to delay the feedback signal. The delayed feedback signal is added to the input voltage of the function generator 23 in the summing stage 24. The total delay time should be approximately half as large as the period of the mechanical natural frequency of oscillation. This results in a natural oscillation, excited for example by a step function such as a shock, being automatically quenched after a time T/2 where T is the period of the natural oscillation.

It will be appreciated by those skilled in the art that several variations can be made to the arrangement herein disclosed without departing from the scope of the present teaching. It is for example contemplated that the mirror 13 can be oscillated by only a single piezoceramic strip 11. In this case the second piezoceramic strip 12 can be thought of as a fixed beam or rigid mounting. Clearly the amplitude of the oscillation will in this case not be as large as if the rigid beam 12 were also a flexible piezoceramic strip.

Finally it should be pointed out that the distance x is of importance and must be properly chosen in each particular arrangement. From a practical standpoint a reduction in the dimension x would lead to an increase in the amplitude of the rotary oscillation executed by the mirror 13 assuming the deflection of the piezoceramic strips could be held constant. This is however not the case because a reduction in the distance x also increases the inertia of the arrangement which tends to reduce the amplitude of movement. Clearly a maximum amplitude of oscillation is achieved, for a given input, for a specific value of x which can be found in any particular case by calculation and/or experiment.

In one specific embodiment the following dimensions and materials were used to advantage:

(a) piezoceramic strips: material: "PxE5" material supplied by the Valvo company, size of each strip: length 21 mm, width 19 mm, thickness 1 mm, separation of strips: x=1 mm;

(b) mirror: rectangular glass mirror: length 20 mm, width 10 mm, thickness 0.2 mm;

(c) synthetic legs: 4 legs arranged two on each piezoceramic strip, length of each leg between top surface of the piezoceramic strips and the underside of the mirror 1.5 mm, width of each leg 2.5 mm thickness of each leg 0.1 mm;

(d) electrical and mechanical particulars: overall capacity of the two piezoceramic strips 55 nF, feedback capacity 4 nF, Q factor of oscillation 60, natural resonant frequency 550 Hz, energising voltage:sawtooth waveform 50 Hz, resetting time $\leq 3$ ms free of any noticeable resonant oscillation, proportionality factor 100 volt/° of mechanical deflection of one strip, total mechanical deflection $\pm 3°$.

We claim:

1. Piezoelectric apparatus for producing rotary oscillation of a mirror, the apparatus comprising first and second piezoceramic flexible strips each having a clamped end and a free end, said strips being substantially aligned in one plane with their free ends facing and spaced apart from each other; AC voltage generating means for generating an AC voltage with a frequency which differs significantly from a natural resonant frequency of said strips; means for applying said AC voltage to said strips to energise them to execute oscillations so that said free ends are periodically displaced in counterphase out of said plane; respective resilient mounting means extending between said free ends and said mirror for mounting said mirror on strips feedback electrode means on at least one of said strips for generating a feedback voltage, means for time delaying said feedback voltage by an amount equal to one half of a period of said natural resonant frequency and means for feeding said feedback voltage back to said strips together with said AC voltage.

2. Apparatus in accordance with claim 1 wherein said resilient mounting means comprises one or more short flexible synthetic legs fastened to the free end of the associated flexible strip at right angles to the plane of the flexible strip and parallel to the free end faces thereof.

3. Apparatus in accordance with claim 2 wherein each synthetic leg is fastened to an end face of the associated flexible strip.

4. Apparatus in accordance with claim 1 wherein said flexible strips are provided with centrally disposed metal electrodes which extend beyond said free ends and wherein said resilient mounting means are attached to said central electrodes.

5. Apparatus in accordance with claim 1 and wherein the or each said feedback electrode is located in the central portion of the associated flexible strip.

6. Apparatus in accordance with claim 1 wherein said feedback electrode is followed by a charge amplifier.

7. Apparatus in accordance with claim 6 wherein said means for time delaying said feedback signal is an all-pass filter.

8. Apparatus in accordance with claim 7 wherein said AC voltage and the amplified and time delayed feedback signal are summed in a scanning stage to produce a scanned signal and wherein said summed signal is applied to said amplifier.

9. Piezoelectric apparatus for producing rotary oscillation of a mirror the apparatus comprising an elongate piezoceramic flexible strip having a clamped end and a free end; resilient means connecting said free end to said mirror; means spaced from said free end for mounting said mirror for pivotal movement relative to fixed structure; AC voltage generating means for generating an AC voltage with a frequency which differs significantly from the resonant frequency of the piezoceramic strip, means for applying said AC voltage to said strips to energise them to produce oscillating movement of said free end, and thereby rotary oscillations of said mirror, feedback electrode means on said strip for generating a feedback voltage, means for time delaying said feedback voltage by an amount equal to one half of a period of said natural frequency of vibration, and means for feeding said feedback voltage back to said strips together with said AC voltage.

* * * * *